(12) United States Patent
Inoue

(10) Patent No.: US 11,991,332 B2
(45) Date of Patent: May 21, 2024

(54) IMAGE PROCESSING APPARATUS INCLUDING FACSIMILE AND COMMUNICATION FUNCTIONS, METHOD FOR CONTROLLING THE SAME, AND STORAGE MEDIUM

(71) Applicant: CANON KABUSHIKI KAISHA, Tokyo (JP)

(72) Inventor: Katsuhiro Inoue, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/315,157

(22) Filed: May 10, 2023

(65) Prior Publication Data

US 2023/0370559 A1 Nov. 16, 2023

(30) Foreign Application Priority Data

May 16, 2022 (JP) ................................. 2022-079898

(51) Int. Cl.
*H04N 1/32* (2006.01)
(52) U.S. Cl.
CPC ....... *H04N 1/3208* (2013.01); *H04N 1/32096* (2013.01)
(58) Field of Classification Search
None
See application file for complete search history.

(56) References Cited

U.S. PATENT DOCUMENTS

| 2008/0094666 A1* | 4/2008 | Gordon | H04N 1/32432 358/440 |
| 2009/0051964 A1* | 2/2009 | Ito | H04N 1/00973 358/1.15 |
| 2021/0120144 A1* | 4/2021 | Takahashi | H04N 1/32128 |

FOREIGN PATENT DOCUMENTS

JP 2021064919 A 4/2021

* cited by examiner

*Primary Examiner* — Lennin R Rodriguezgonzalez
*Assistant Examiner* — Lennin R Rodriguez
(74) *Attorney, Agent, or Firm* — Canon U.S.A., Inc. IP Division

(57) ABSTRACT

An image processing apparatus including a fax function and a communication function includes at least one memory storing instructions, and at least one processor executing the instructions causing the image forming apparatus to set a first setting for transfer of data in a case where the data is received using the fax function, perform a transfer process of transferring the data received using the fax function based on the first setting, and transmit, using the communication function, information pertaining to the transfer process to an external apparatus that provides a message sharing service.

8 Claims, 18 Drawing Sheets

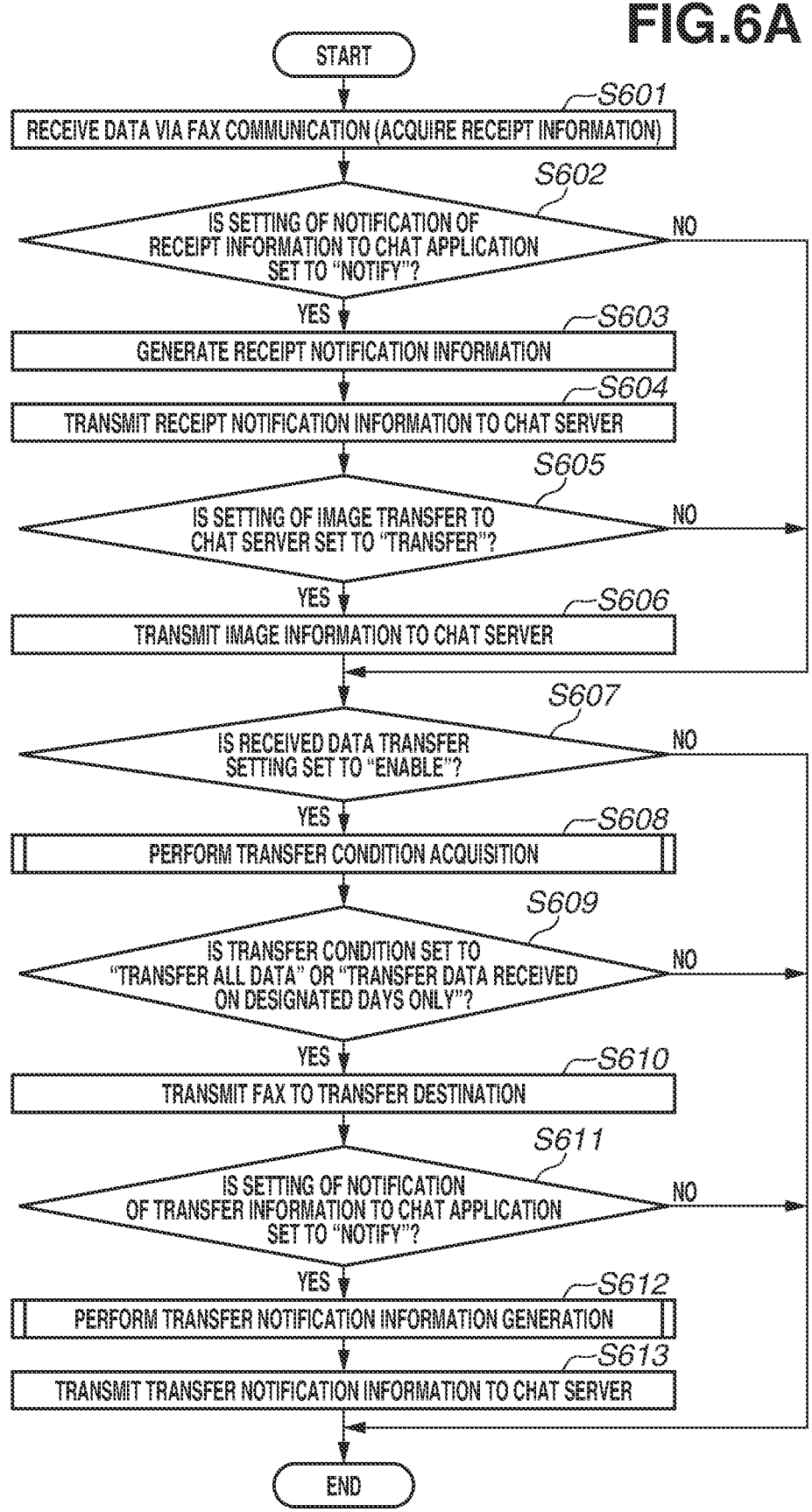

FIG.8B

```
< TRANSFER TABLE REGISTRATION >          — 820
   [ REGISTER ]  [ CANCEL ]
```

821 — TRANSFER TABLE NAME: [ TRANSFER 1 ]

RECEIVED DATA TRANSMISSION SOURCE SETTING:

822 — RECEPTION LINE SELECTION: ☐ INTERNET FAX  ☑ FAX

823 — TRANSMISSION SOURCE ADDRESS SETTING:
 ● TRANSFER ALL RECEIVED DATA
 ○ TRANSFER DATA RECEIVED FROM DESIGNATED TRANSMISSION SOURCE ONLY

824 — TRANSMISSION SOURCE ADDRESS LIST:

825 —

| DESTINATION NAME | TYPE | ADDRESS |
|---|---|---|
| ZZZ | FAX | 075-ZZZZ-ZZZZ |
|  |  |  |
|  |  |  |

826 (TYPE)  827 (ADDRESS)

828 — [ADD (ADDRESS BOOK)]   [ADD (DIRECT INPUT)] — 829   [DELETE] — 830

RECEIVED DATA TRANSFER DESTINATION SETTINGS:

831 — TRANSFER CONDITION:
 ○ DO NOT TRANSFER
 ● TRANSFER ALL DATA
 ○ TRANSFER DATA RECEIVED ON DESIGNATED DAYS ONLY

832 — DAYS: ☐ MONDAY ☐ TUESDAY ☑ WEDNESDAY ☐ THURSDAY ☑ FRIDAY ☑ SATURDAY ☑ SUNDAY

833 — TRANSFER DESTINATION LIST:

| DESTINATION NAME | TYPE | ADDRESS |
|---|---|---|
| AAA | FAX | 075-XXXX-XXXX |
|  |  |  |
|  |  |  |

834 — [ADD (ADDRESS BOOK)]   [ADD (DIRECT INPUT)] — 835   [DELETE] — 836

FIG.9

| | TIME | TYPE | PROTOCOL | DESTINATION NAME | ADDRESS | RESULT |
|---|---|---|---|---|---|---|
| | 901 | 902 | 903 | 904 | 905 | 906 |
| 907 | 2021/12/22 12:10 | RECEIVE | FAX | ZZZ | 075-ZZZZ-ZZZZ | NG |
| | 2021/12/22 12:11 | TRANSMIT (TRANSFER) | FAX | AAA | 075-AAAA-AAAA | OK |
| | 2021/12/23 12:10 | TRANSMIT (TRANSFER) | FAX | BBB | 075-BBBB-BBBB | OK |
| | 2021/12/24 11:00 | TRANSMIT | INTERNET FAX | CCC | ifax@XXXX.XXXX | OK |
| | 2021/12/25 10:00 | TRANSMIT | INTERNET FAX | DDD | ifax@YYYY.YYYY | OK |

900

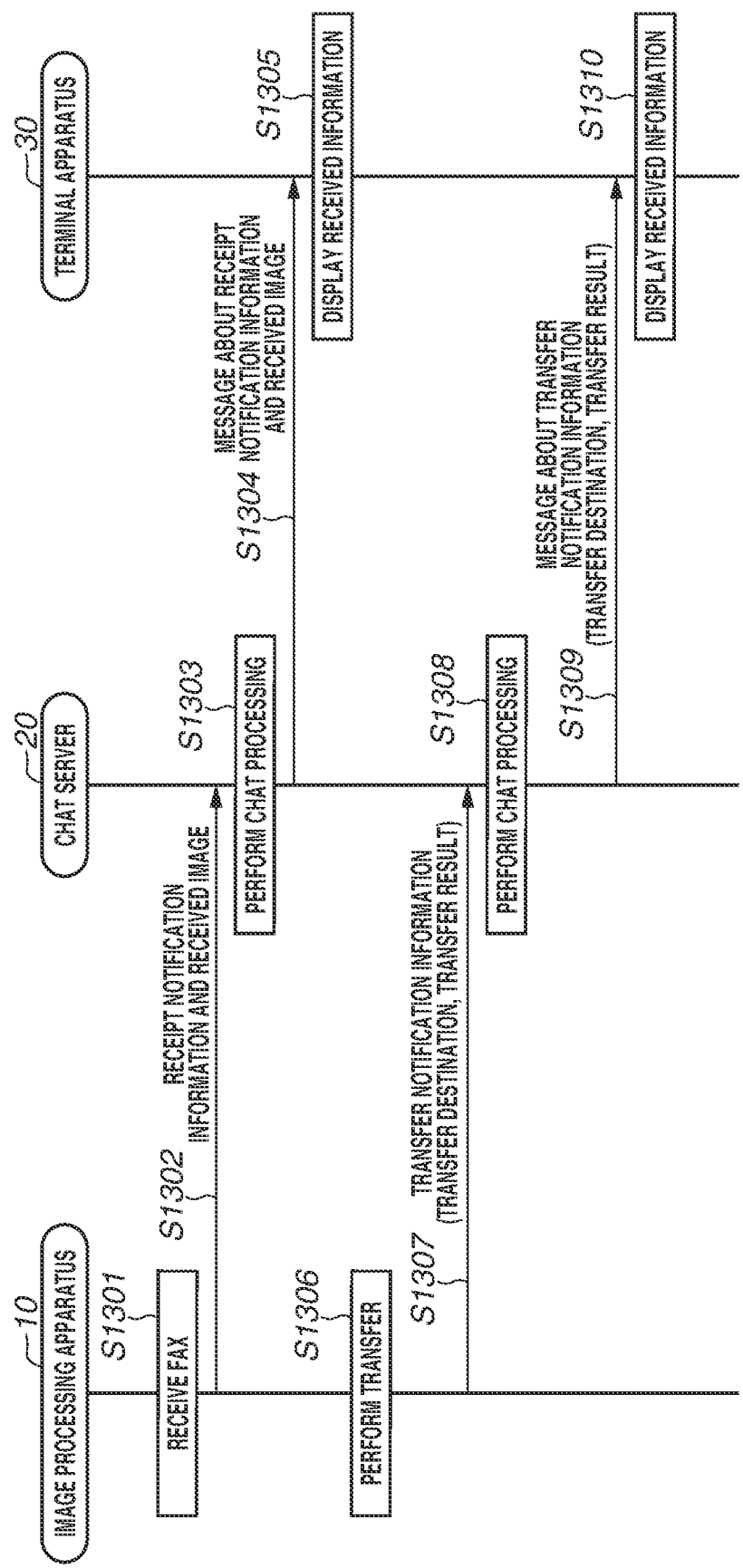

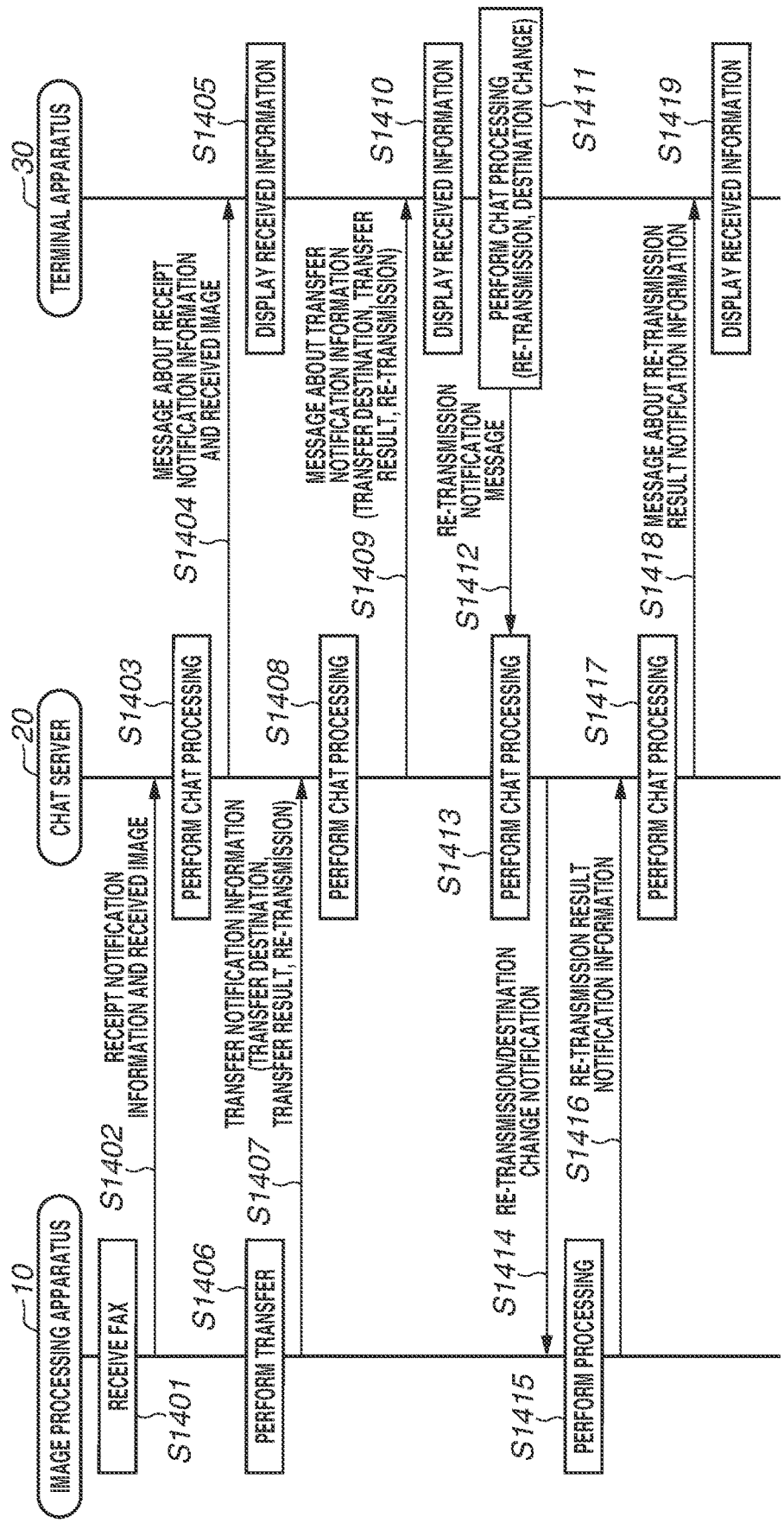

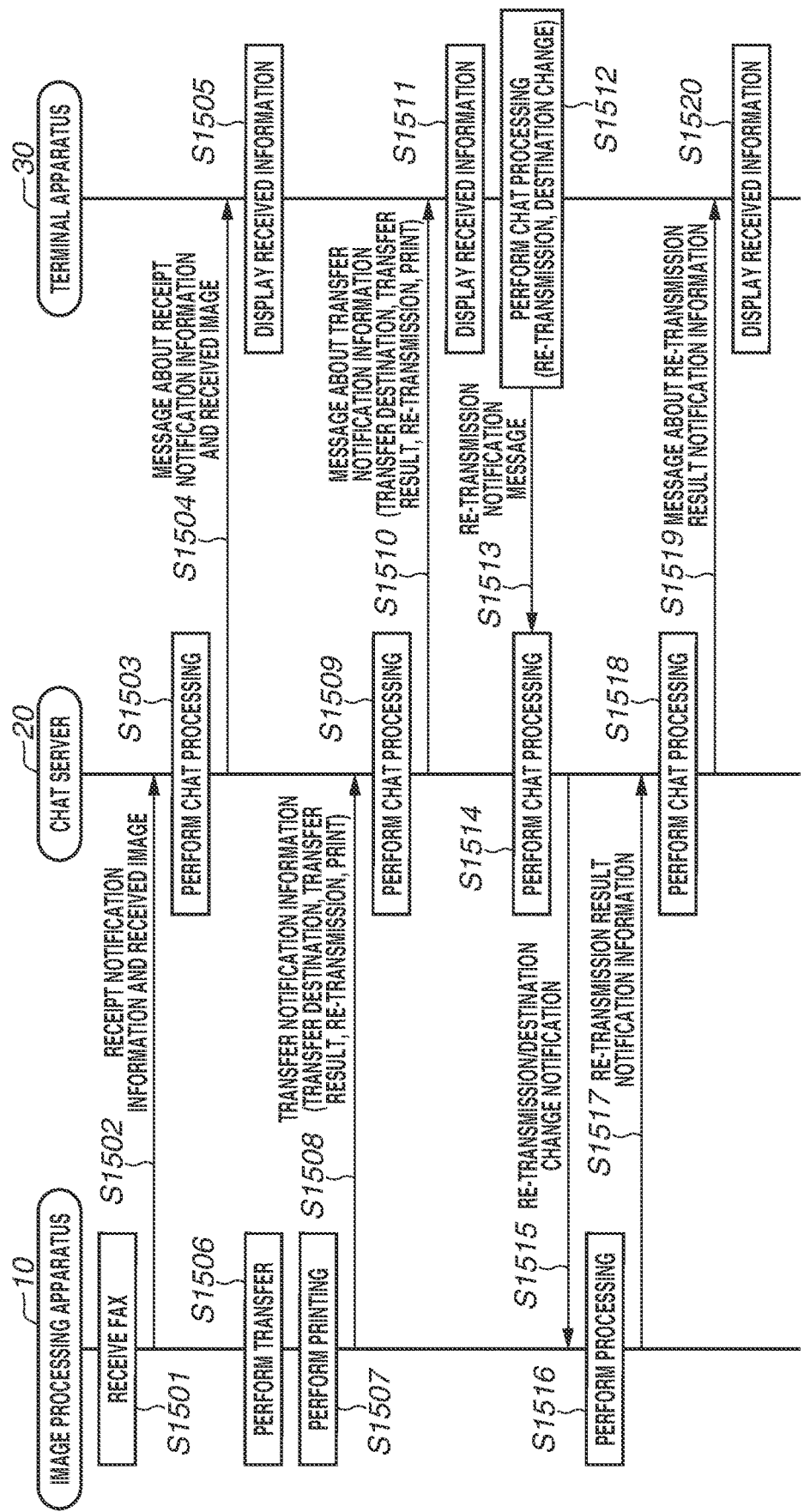

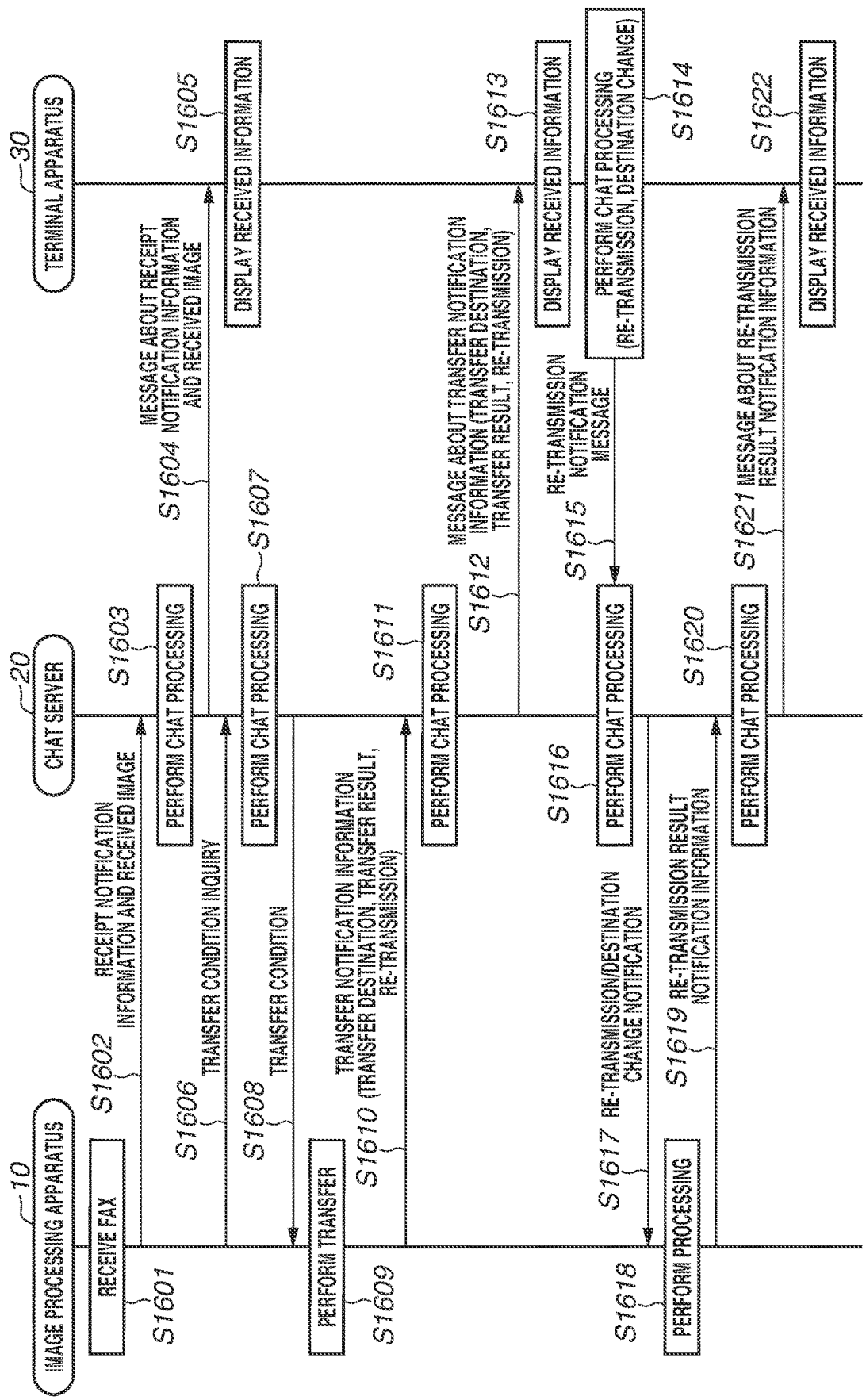

IMAGE PROCESSING APPARATUS INCLUDING FACSIMILE AND COMMUNICATION FUNCTIONS, METHOD FOR CONTROLLING THE SAME, AND STORAGE MEDIUM

BACKGROUND

Field

The present disclosure relates to an image processing apparatus configured to provide facsimile (fax) receipt notifications using a communication tool such as a chat application.

Description of the Related Art

There have been functions of providing notification of receipt information to a pre-registered notification destination such as an email address on receipt of data via fax. Japanese Patent Application Laid-Open No. 2021-64919 discusses a technique for providing notification of fax receipt notification information and document image information in a chat format from an image forming apparatus to a terminal apparatus via a chat server in a case where the image forming apparatus receives a fax.

Japanese Patent Application Laid-Open No. 2021-64919 discusses a technique for designating a transfer destination telephone number and causing an image forming apparatus to perform a process of transferring received image information to the designated telephone number using a chat application.

There are cases where an image processing apparatus having a function of receiving faxes can transfer received fax data based on a preset transfer condition setting. There are also cases where a setting of printing of fax received data by the image processing apparatus in a case where the fax received data is transferred can be set.

Japanese Patent Application Laid-Open No. 2021-64919, however, does not consider the foregoing main settings in the image processing apparatus. Thus, the conventional technique has an issue that a processing result based on a main setting, such as the above-described transfer condition) in an image processing apparatus in a case where a fax is received by the image processing apparatus cannot be checked by a user via a communication tool such as a chat server.

SUMMARY

According to an aspect of the present disclosure, an image processing apparatus including a fax function and a communication function includes at least one memory storing instructions, and at least one processor executing the instructions causing the image forming apparatus to set a first setting for transfer of data in a case where the data is received using the fax function, perform a transfer process of transferring the data received using the fax function based on the first setting, and transmit, using the communication function, information pertaining to the transfer process to an external apparatus that provides a message sharing service.

Further features will become apparent from the following description of exemplary embodiments with reference to the attached drawings.

BRIEF DESCRIPTION OF THE DRAWINGS

FIGS. 6A, 6B, and 6C are flowcharts illustrating a receipt notification process and a transfer notification process by the image processing apparatus.

FIGS. 8A and 8B illustrate an example of a transfer setting screen of the image processing apparatus.

FIG. 9 illustrates an example of communication history list information stored in a hard disk drive (HDD) of the image processing apparatus.

FIGS. 10A to 10D are diagrams illustrating a sequence of making notification of receipt information and transfer information from the image processing apparatus to the terminal apparatus.

DESCRIPTION OF THE EMBODIMENTS

An exemplary embodiment will be described below with reference to the drawings. The below-described exemplary embodiment is merely an example for describing the present disclosure and is not seen to be limiting.

A process according to the present exemplary embodiment where an image processing apparatus 10 having a facsimile (fax) function receives a fax from a fax apparatus 50 and performs a transfer process of transferring the received fax to a fax apparatus 60 based on a main setting (transfer condition, or the like) in the image processing apparatus 10 will be described below. According to the present exemplary embodiment, notification information pertaining to the transfer process is provided to a user via a chat server in a case where the transfer process is performed based on the main setting.

Figure 1:
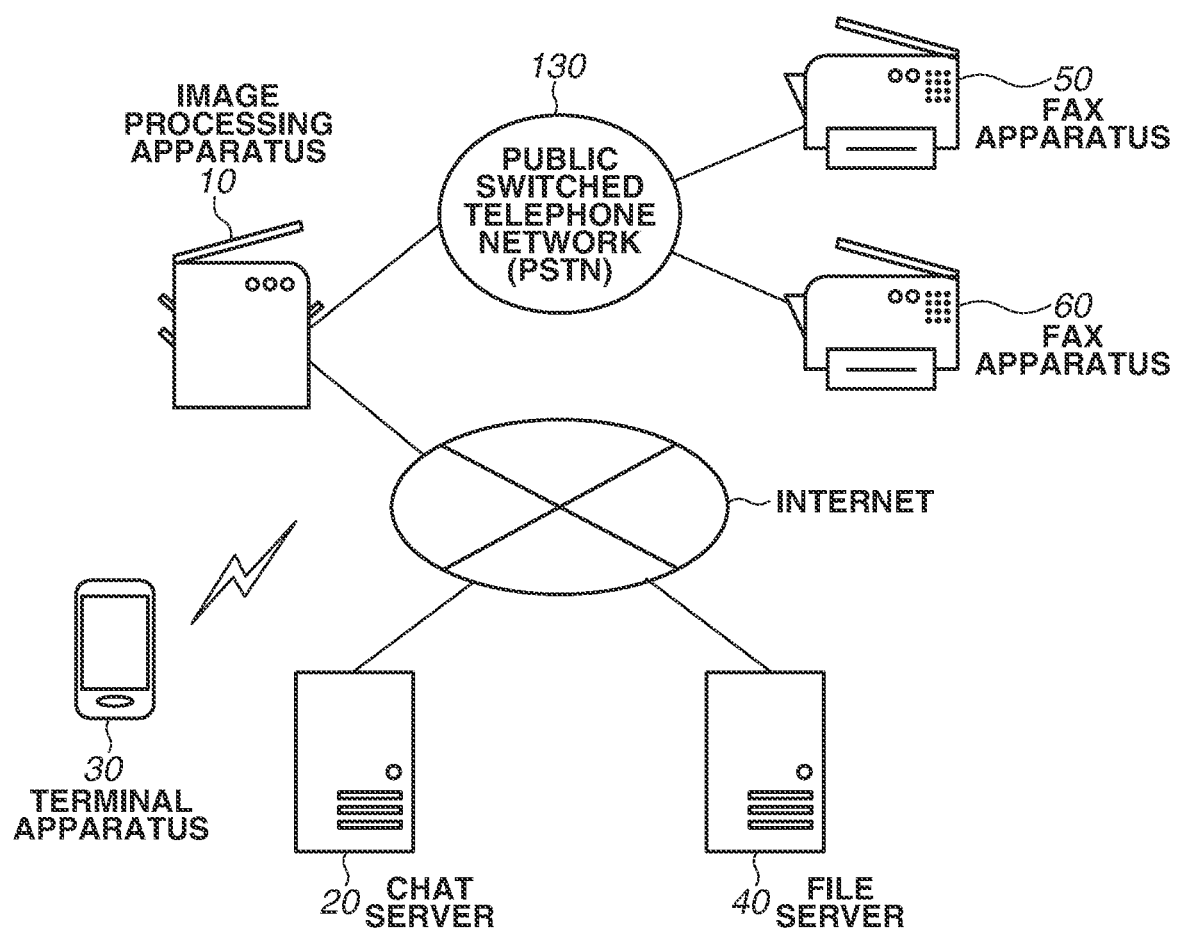
FIG. 1 is an explanatory diagram illustrating an example of a configuration of a fax receipt notification system.

FIG. 1 is an explanatory diagram illustrating a configuration of a system including an image processing apparatus according to the present exemplary embodiment. The system includes the image processing apparatus 10, a chat server 20, a terminal apparatus 30, and a file server 40. The image processing apparatus 10, the chat server 20, the terminal apparatus 30, where a chat application for receiving a service provided by the chat server 20 is installed, and the file server 40 are connected to each other via a network such as the Internet.

In the system, external fax apparatuses 50 and 60 and the image processing apparatus 10 are connected to each other via a public switched telephone network (PSTN) 130, and can transmit and receive faxes. According to the present exemplary embodiment, the fax apparatus 50 transmits a fax to the image processing apparatus 10, and in a case where a transfer condition is met, the image processing apparatus 10 transfers image information received via fax to the fax apparatus 60. The image processing apparatus 10 and the fax apparatuses 50 and 60 are connected via a network and can transmit and receive data via the network using an Internet fax protocol.

Figure 2:
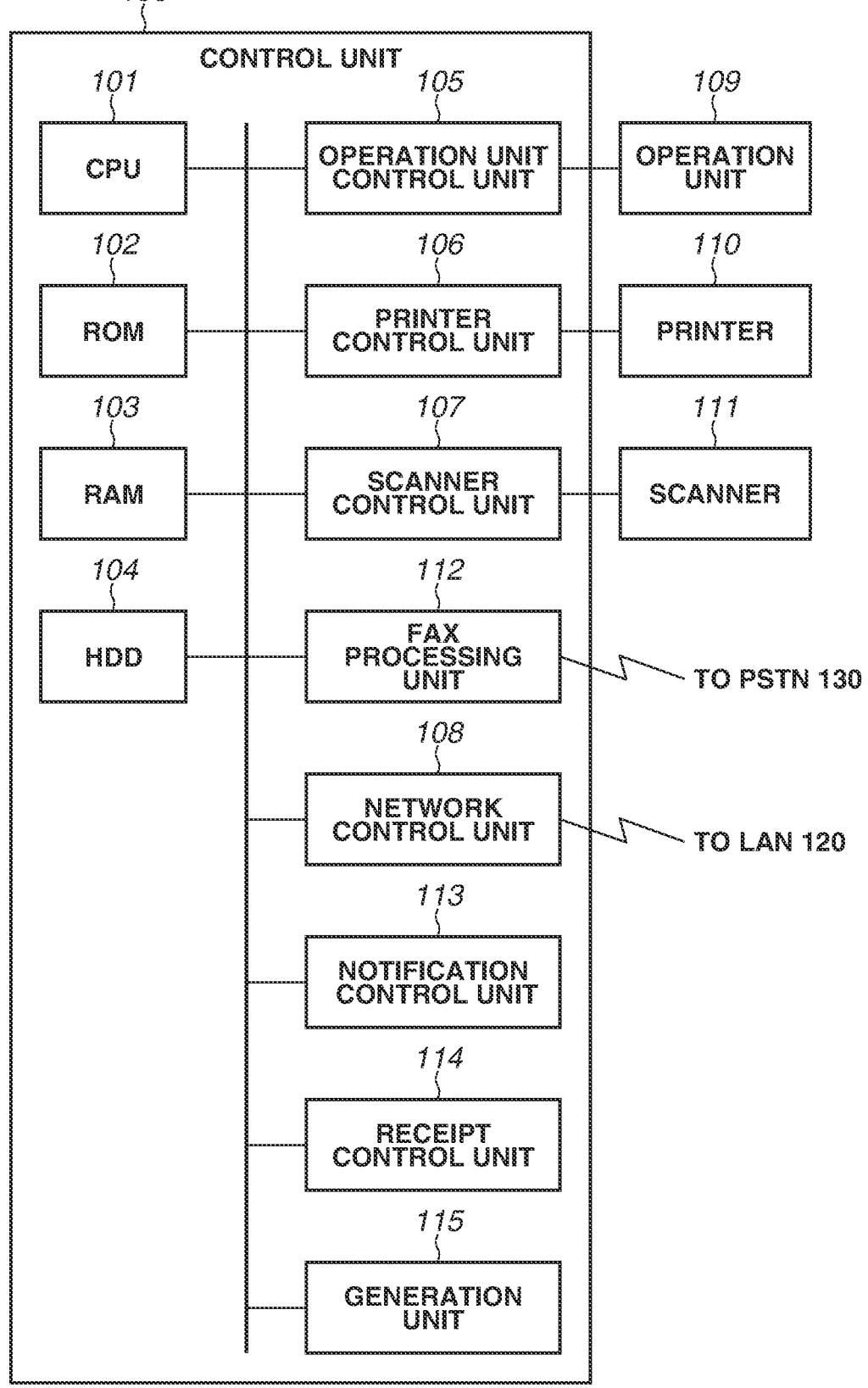
FIG. 2 is a block diagram illustrating an example of a configuration of an image processing apparatus.

FIG. 2 is a block diagram illustrating a configuration of the image processing apparatus 10 according to the present exemplary embodiment.

A control unit 100 including a central processing unit (CPU) 101 controls operations of the image processing apparatus 10. The CPU 101 reads control programs stored in a read-only memory (ROM) 102 and performs various types of control such as reading control and transmission control. The ROM 102 is a boot ROM and stores a system boot program. A random access memory (RAM) 103 is used as a temporary storage area such as a main memory and a work area for the CPU 101. A hard disk drive (HDD) 104 stores image data, various programs, various information tables such as an address book and a transfer condition transfer destination list, and setting values for various functions. The HDD 104 is used to store scanned documents and to temporarily store fax data received from the fax apparatus 50.

An operation unit control unit 105 is an interface for connecting an operation unit 109 and the control unit 100. The operation unit 109 includes a liquid crystal display unit with a touch panel function and a keyboard. A printer control unit 106 is an interface for connecting a printer 110 and the control unit 100. Image data to be printed by the printer 110 is transferred from the control unit 100 via the printer control unit 106, and the printer 110 prints the image data on a recording medium (sheet). A scanner control unit 107 is an interface for connecting a scanner 111 and the control unit 100. The scanner 111 reads an image on a document, generates image data, and inputs the image data to the control unit 100 via the scanner control unit 107.

A fax processing unit 112 is connected to a telephone line such as the PSTN 130 and transmits and receives fax data to and from the other fax apparatuses 50 and 60 via the telephone line. In a case where the fax processing unit 112 is to perform fax transmission, a document is set on the scanner 111, and when a fax transmission operation is performed via the operation unit 109, a fax process is performed. In a case where a communication procedure with a communication partner can be performed, a process of sequential transmission to a partner device is performed via a communication line. In a case where the fax processing unit 112 is to perform fax reception, the fax processing unit 112 acquires receipt information while performing a communication process and stores the acquired receipt information in the HDD 104. Examples of receipt information to be acquired are telephone number information, a transmitting subscriber identification signal (TSI), a receipt time, and a received image. Various types of image processing are performed on image data as needed, and the resulting image data is output from the printer 110 via the printer control unit 106.

In a case where the fax processing unit 112 is to perform fax transfer, the fax processing unit 112 acquires, after a fax is received, a received data transfer/storage setting and a transfer condition setting that are stored in advance in the HDD 104. The received data transfer/storage setting and the transfer condition setting will be described below with reference to FIGS. 8A and 8B. In a case where the received data transfer setting is "ENABLE" and a transfer condition of the transfer condition setting is met, the fax is transmitted to a destination registered in a transfer list. According to the present exemplary embodiment, the fax is transmitted to the fax apparatus 60.

In a case where a received data print setting of the received data transfer setting that is stored in advance in the HDD 104 is "PRINT ALWAYS" or "PRINT IN CASE OF ERROR ONLY", the received data is output from the printer 110 via the printer control unit 106.

A generation unit 115 analyzes receipt information received from the fax apparatus 50 and generates receipt notification information. A notification control unit 113 provides notification of the generated receipt notification information to the terminal apparatus 30 via the chat server 20.

The generation unit 115 generates transfer notification information based on address information and result information of a communication history stored in the HDD 104, which will be described below with reference to FIG. 9, after the fax transfer is completed. The notification control unit 113 provides notification of the generated transfer notification information to the terminal apparatus 30 via the chat server 20.

A receipt control unit 114 receives a re-transmission instruction input by a user via the terminal apparatus 30 from the chat server 20.

A network control unit 108 is an interface for connecting the control unit 100 to a network. The network control unit 108 achieves a communication function of transmitting and receiving information to and from an external apparatus such as a chat server connected via a network such as a local area network (LAN) 120 or the Internet.

Major functions (applications) of the image processing apparatus 10 include:

- A "copy" function of printing, using the printer 110, image data generated by scanning an image on a document using the scanner 111.
- A "print" function of printing image data using the printer 110 based on a print job input from an external apparatus such as a client personal computer (client PC).
- A "scan and transmit" function of transmitting, from the network control unit 108 external to the image processing apparatus 10, image data generated by scanning an image on a document using the scanner 111. With this function, the transmission of a file including image data by email attachment using the Simple Mail Transfer Protocol (SMTP) can be used.
- A "scan and store" function of storing, in the HDD 104, image data generated by scanning an image on a document using the scanner 111.
- A "use stored file" function of printing image data stored in the HDD 104 using the printer 110 or transmitting image data stored in the HDD 104 external to the image processing apparatus 10 via the network control unit 108.
- A "browser" function of viewing, printing, and/or storing data on a web server via a web browser.
- A "fax" function of transmitting and receiving a document to and from the fax apparatus 50 via a telephone line.

Figure 3:
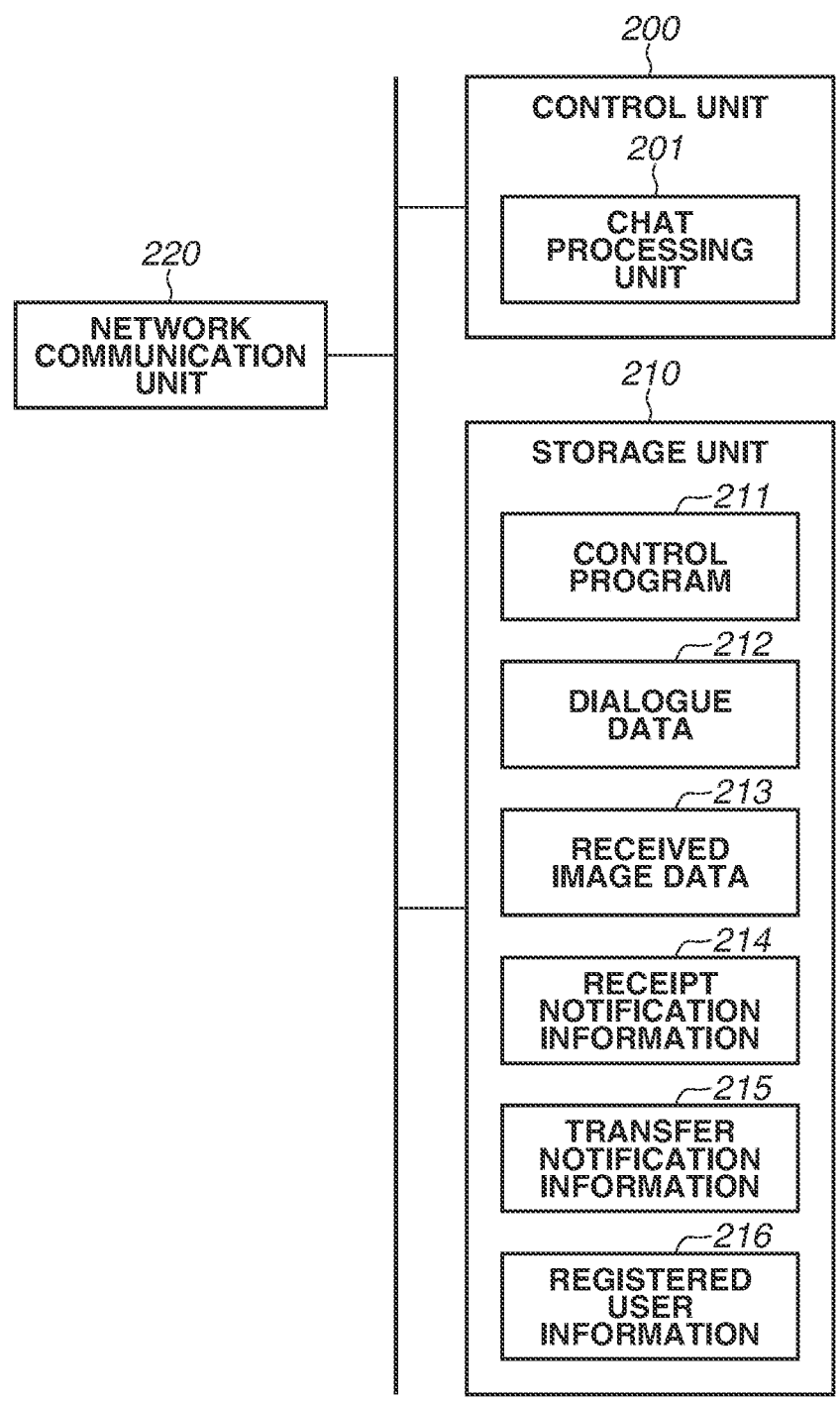
FIG. 3 is a block diagram illustrating an example of a configuration of a chat server according.

FIG. 3 is a block diagram illustrating a configuration of the chat server 20 according to an exemplary embodiment. The chat server 20 includes a control unit 200, a storage unit 210, and a network communication unit 220. The chat server 20 provides a chat service to the terminal apparatus 30. The chat service is different from an email service provided by a SMTP server and is a service that is a communication tool enabling a plurality of users to share messages in substantially real time. The chat server 20 is a server that provides a message sharing service to applications supporting services of the image processing apparatus 10 and the terminal apparatus 30.

The control unit 200 includes a chat processing unit 201 and functions based on a control program 211 stored in the storage unit 210. The chat processing unit 201 functions as artificial intelligence (AI) and responds with an appropriate chat text based on a chat text received from the terminal apparatus 30. As described above, the chat server 20 has an automatic dialogue function and functions as a chatbot.

The storage unit 210 includes the control program 211, dialogue data 212, received image data 213, receipt notification information 214, transfer notification information 215, and registered user information 216.

The control program 211 includes an automatic dialogue program. The automatic dialogue program has a function of recognizing details via a dialogue (chat) so that details of an instruction are recognized and a process is performed based on the details of the instruction.

The dialogue data 212 is dialogue data for use in performing a chat process and includes necessary chat texts for a dialogue process including chat texts learned by the AI.

The received image data 213 is a received image data file of a fax receipt notification. The receipt notification information 214 is fax receipt notification information transmitted from the image processing apparatus 10. The transfer notification information 215 is fax transfer notification information transmitted from the image processing apparatus 10.

The registered user information 216 is registration information about chat users. A user performs a setting process of registering the image processing apparatus 10 of a chat partner from the terminal apparatus 30, and notification destination information about the chat partners is stored as the registered user information 216.

The network communication unit 220 receives the fax receipt notification information 214 and the transfer notification information 215 from the image processing apparatus 10 via the Internet.

Figure 4:
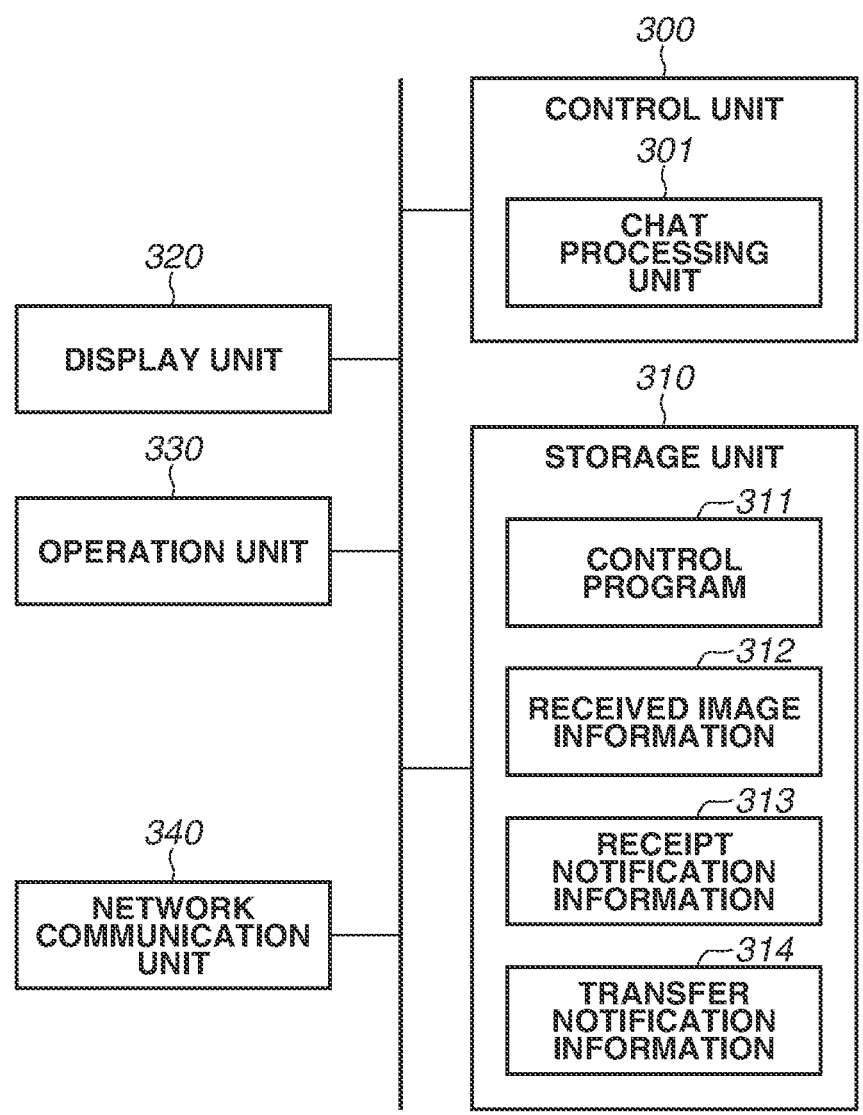
FIG. 4 is a block diagram illustrating an example of a configuration of a terminal apparatus according.

FIG. 4 is a block diagram illustrating a configuration of the terminal apparatus 30 according to an exemplary embodiment.

The terminal apparatus 30 illustrated in FIG. 4 is, for example, a smartphone, a laptop personal computer (laptop PC), or a tablet and includes a control unit 300, a storage unit 310, a display unit 320, an operation unit 330, and a network communication unit 340. The chat application is installed in the terminal apparatus 30, and the terminal apparatus 30 is notified of fax receipt notification information and received document image information from the chat server 20 using an application programming interface (API) of the chat application.

The control unit 300 is a functional unit for controlling the terminal apparatus 30. The control unit 300 implements various functions by reading a plurality of control programs 311 stored in the storage unit 310 and executing each of the read control programs 311, and includes one or more calculation devices (e.g., CPU). The plurality of control programs 311 includes the chat application for chatting with the chat server 20.

The storage unit 310 includes the plurality of control programs 311, received image information 312, receipt notification information 313, and transfer notification information 314.

The received image information 312 is a received image file transmitted as a fax receipt notification. The receipt notification information 313 is fax receipt notification information transmitted from the image processing apparatus 10. The transfer notification information 314 is fax transfer notification information transmitted from the image processing apparatus 10.

The display unit 320 displays various states of the terminal apparatus 30 and an operation input state. The display unit 320 includes, for example, a liquid crystal display (LCD) or an organic electroluminescence (organic EL) panel. The operation unit 330 includes buttons and switches for receiving operation inputs from a user. The operation unit 330 can be implemented by a hardware input apparatus such as switches and a keyboard or by a touch panel integrally formed with the display unit 320. In this case, a general detection method such as a resistive method, an infrared method, an electromagnetic induction method, or a capacitive method can be used as a method for detecting an input to the touch panel.

The network communication unit 340 receives fax receipt notification information and transfer notification information from the chat server 20 via the Internet.

Figure 5:
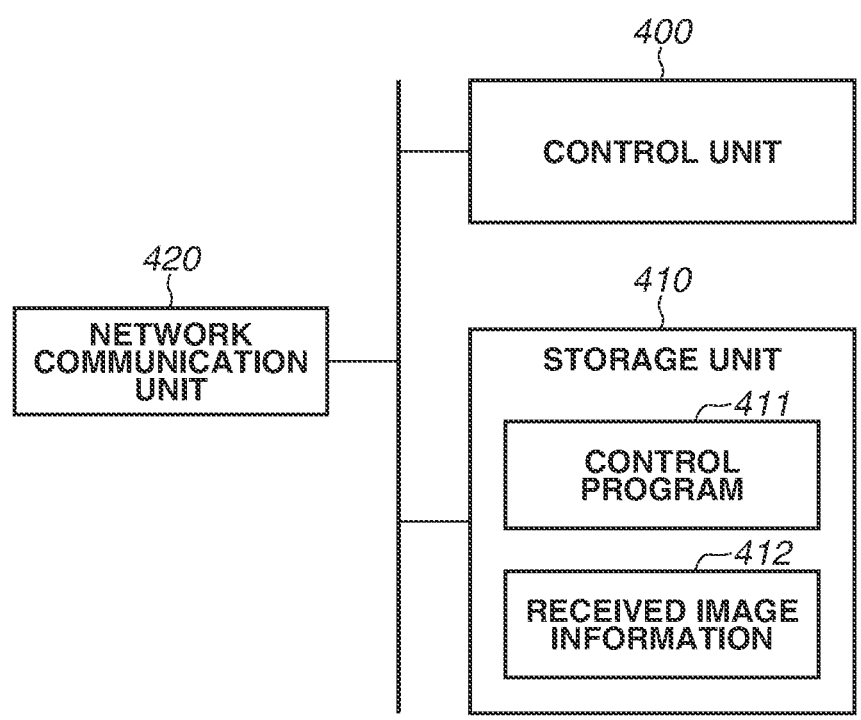
FIG. 5 is a block diagram illustrating an example of a configuration of a file server according.

FIG. 5 is a block diagram illustrating a configuration of the file server 40 according to an exemplary embodiment of the present invention.

The file server 40 is a server storing data as a shared file on a network and can be accessed via the network. In the system, a file of all pages of images received via fax is stored, and a uniform resource locator (URL) of the file is provided to enable external access to the terminal apparatus 30.

The file server 40 includes a control unit 400, a storage unit 410, and a network communication unit 420.

The control unit 400 functions based on a control program 411 stored in the storage unit 410. The storage unit 410 includes the control program 411 and received image information 412. The received image information 412 is a file of all pages of document images transmitted from the image processing apparatus 10. The network communication unit 420 receives received image data from the image processing apparatus 10 via the Internet.

Figure 6B:
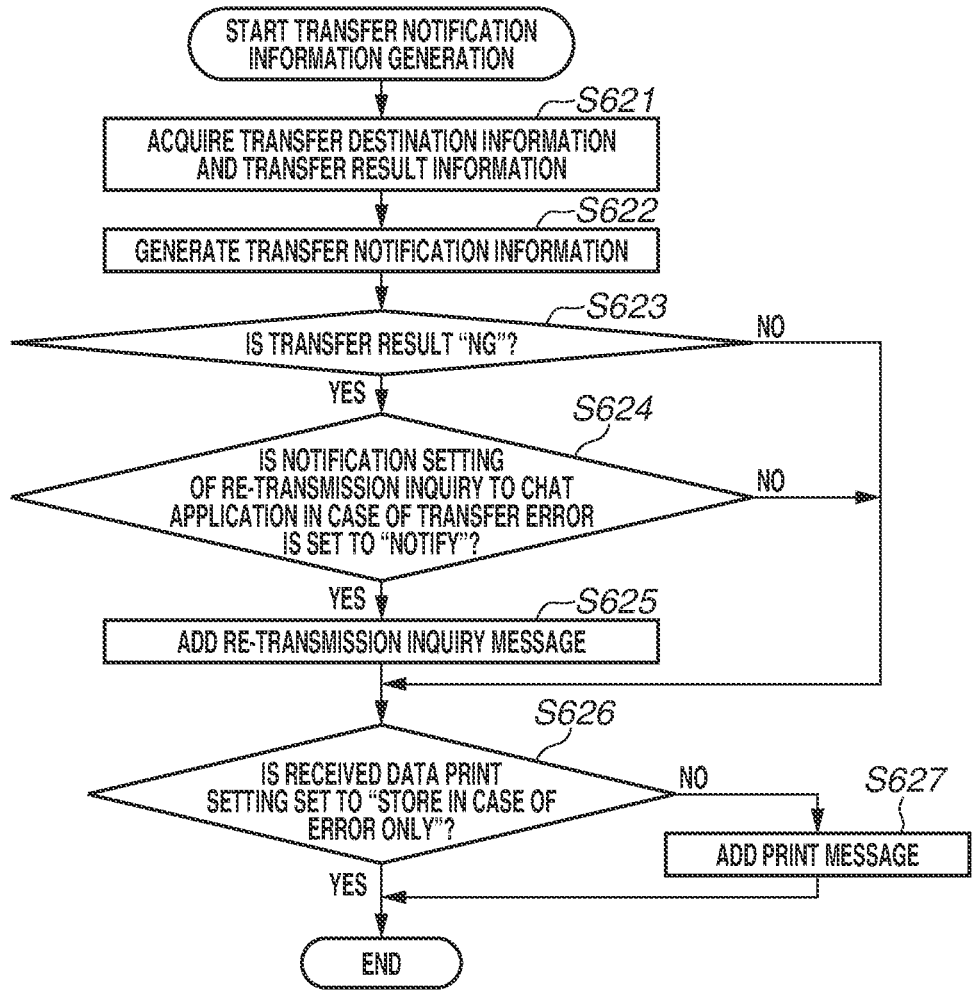
Figure 6C:
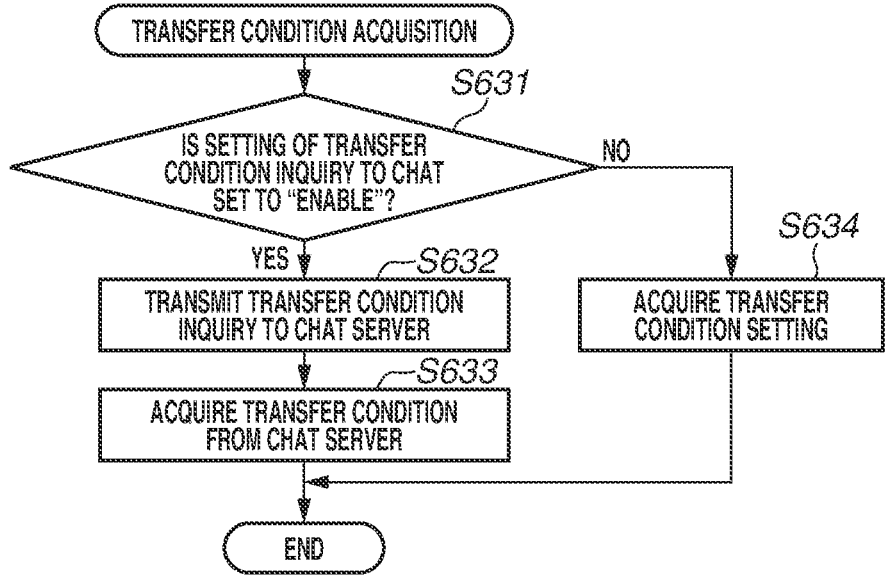

FIGS. 6A to 6C are flowcharts illustrating processes according to the present exemplary embodiment implemented by the image processing apparatus 10 in a case where the image processing apparatus 10 receives a fax from the fax apparatus 50. Each process is implemented by the CPU 101 of the image processing apparatus 10 reading a program corresponding to the process from a memory and executing the read program.

First, an entire process that is performed by the image processing apparatus 10 will be described below with reference to FIG. 6A.

In step S601, the fax processing unit 112 receives data from the fax apparatus 50 via fax communication. At this time, the fax processing unit 112 acquires receipt information and a received image and stores the acquired receipt information and the acquired received image in the HDD 104.

Figure 7:
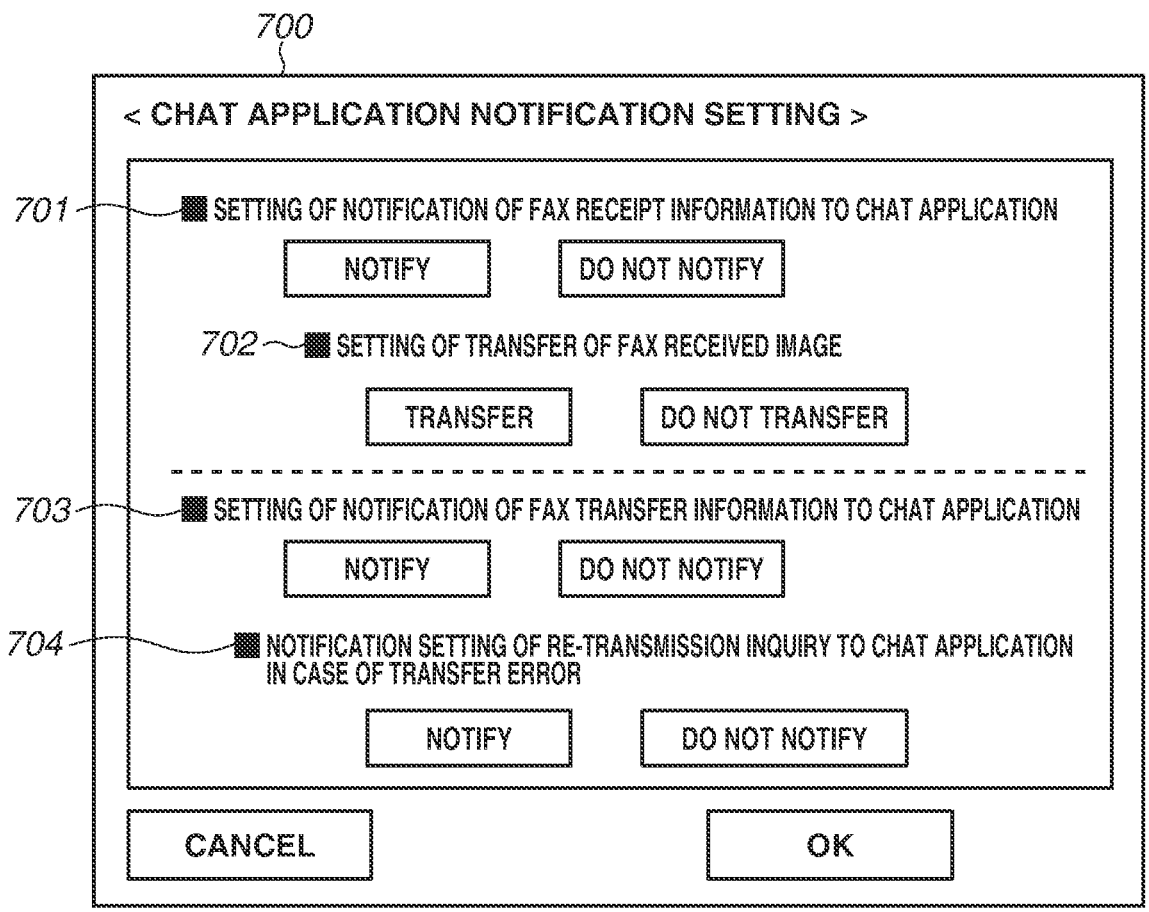
FIG. 7 illustrates an example of a chat application notification setting screen of the image processing apparatus.

In step S602, the generation unit 115 determines whether a setting of notification of fax receipt information to the chat application in FIG. 7 is set to "NOTIFY" in the image processing apparatus 10.

FIG. 7 illustrates a setting screen 700 associated with the setting of notification to the chat application that is provided by the image processing apparatus 10. The setting screen 700 is provided to the operation unit 109, which is also a display apparatus of the image processing apparatus 10, or to a web browser of an external apparatus via a network.

A notification setting of notification of fax receipt information to the chat application 701 enables setting whether to provide a fax receipt information notification to the chat application when the image processing apparatus 10 receives a fax. In a case where "NOTIFY" is set, a receipt information notification is provided to the chat application when the image processing apparatus 10 receives a fax. In a case where "DO NOT NOTIFY" is set, no receipt information notification is provided to the chat application when the image processing apparatus 10 receives a fax.

In a case where the notification setting of notification of fax receipt information to the chat application 701 is set to "NOTIFY", a setting of transfer of a fax received image 702 enables setting whether to transfer a received image to the chat application when the image processing apparatus 10 receives a fax. In a case where "TRANSFER" is set, the received image is transferred to the chat application when the image processing apparatus 10 receives a fax. In a case where "DO NOT TRANSFER" is set, the received image is not transferred to the chat application when the image processing apparatus 10 receives a fax.

A notification setting of notification of fax transfer information to the chat application 703 enables setting whether to make notification of transfer information to the chat application when the image processing apparatus 10 performs fax transfer. In a case where "NOTIFY" is set, notification of transfer information is provided to the chat application when the image processing apparatus 10 performs fax transfer. In a case where "DO NOT NOTIFY" is set, notification of transfer information is not provided to the chat application when the image processing apparatus 10 performs fax transfer.

In a case where the notification setting of notification of fax transfer information to the chat application 703 is set to "NOTIFY", in a notification setting of re-transmission inquiry to the chat application in a case of a transfer error 704 enables whether to provide notification of a re-transmission inquiry to the chat application when the image processing apparatus 10 performs fax transfer and an error occurs. In a case where "NOTIFY" is set, notification of a re-transmission inquiry is provided to the chat application when the image processing apparatus 10 performs fax transfer and an error occurs. In a case where "DO NOT NOTIFY" is set, notification of no re-transmission inquiry is provided to the chat application.

In step S602, in a case where the notification setting of notification of fax receipt information to the chat application 701 is set to "NOTIFY" (YES in step S602), the processing proceeds to step S603. In a case where "DO NOT NOTIFY" is set (NO in step S602), the processing proceeds to step S607.

In step S603, the generation unit 115 generates receipt notification information to be provided to the chat server 20 based on the receipt information stored in the HDD 104. In step S604, the notification control unit 113 transmits the receipt notification information generated in step S603 from the network control unit 108 to the chat server 20 via the LAN 120. The receipt notification information transmitted to the chat server 20 is referred to by the chat application of the terminal apparatus 30 and can be viewed by a user.

In step S605, the generation unit 115 determines whether the setting of transfer of a fax received image 702 in FIG. 7 is set to "TRANSFER". In a case where the setting 702 is set to "TRANSFER" (YES in step S605), the processing proceeds to step S606. In a case where the setting 702 is set to "DO NOT TRANSFER" (NO in step S605), the processing proceeds to step S607. In step S606, the notification control unit 113 provides notification of the received image stored in the HDD 104 to the chat server 20.

Figure 8A:
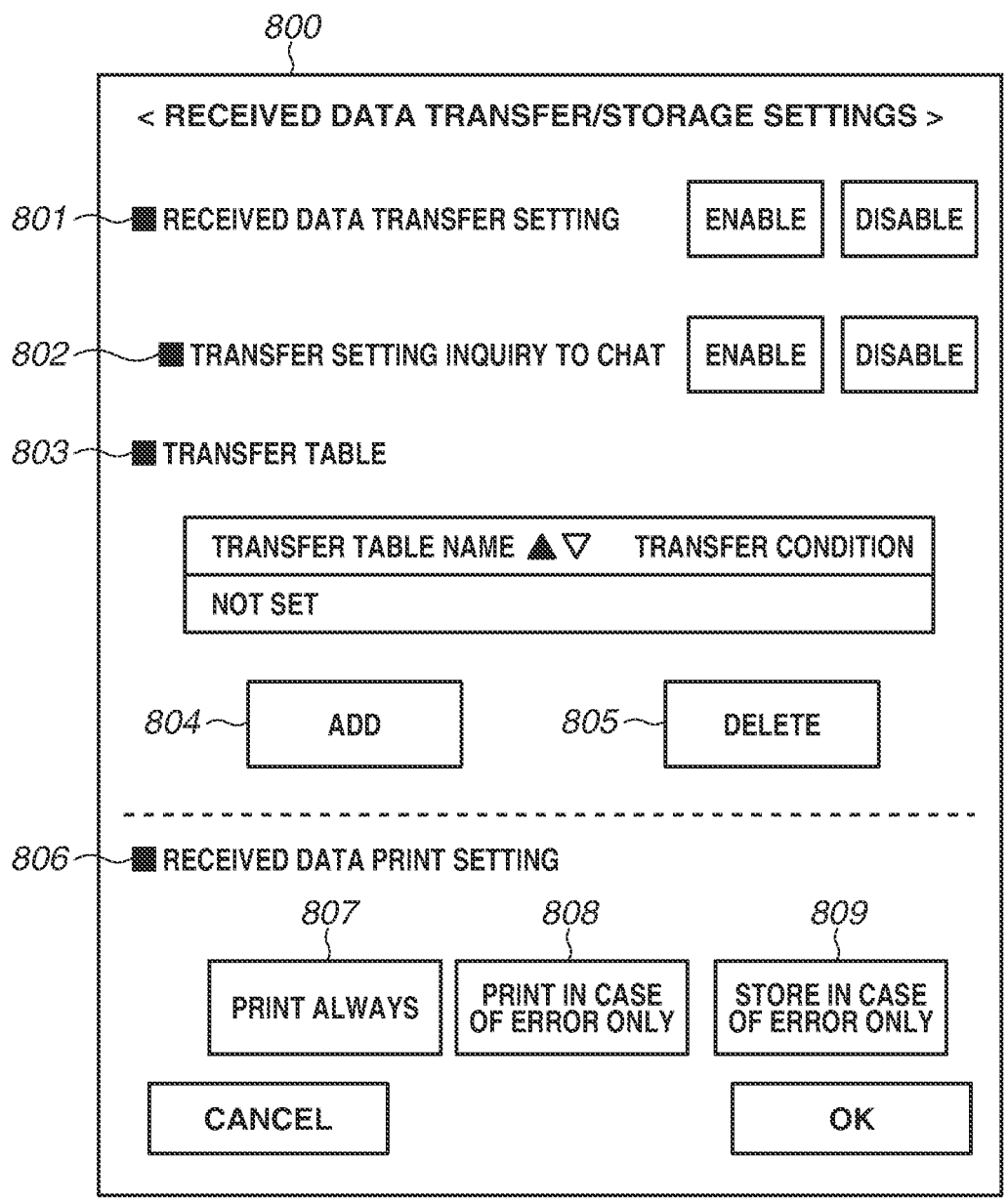

In step S607, the fax processing unit 112 refers to a received data transfer setting 801 set via a setting screen in FIG. 8A and stored in the HDD 104.

FIG. 8A is a diagram illustrating an example of a setting screen 800 via which a user sets settings for a case where the image processing apparatus 10 receives a fax and transfers the fax to another fax apparatus. The setting screen 800 is provided to the operation unit 109, which is also a display apparatus of the image processing apparatus 10, or a web browser of an external apparatus via a network.

The received data transfer setting 801 is whether to enable the function of receiving a fax and transferring the fax to another fax apparatus by the image processing apparatus 10. In a case where "ENABLE" is set, the transfer to another fax apparatus is performed based on a transfer setting described below when the image processing apparatus 10 receives a fax. In a case where "DISABLE" is set, the transfer is not performed when the image processing apparatus 10 receives a fax.

In a setting 802 of transfer setting inquiry to the chat, whether to enable the function of transmitting a transfer setting inquiry to the chat server 20 is set in a case where the received data transfer setting 801 is "ENABLE". In a case where "ENABLE" is set, a transfer condition acquired via a transfer setting inquiry to the chat server 20 is used instead of using a transfer condition in a transfer table 803 described below. In a case where "DISABLE" is set, no transfer setting inquiry is transmitted to the chat server 20.

The transfer table 803 is a transfer table for registering transfer conditions. An "ADD" button 804 is a button for generating a transfer table and adding the generated transfer table. In a case where selection of the "ADD" button 804 is detected, the screen 800 changes to a screen illustrated in FIG. 8B. In FIG. 8B, a received data transfer condition can be set. Specifically, a transfer target transmission source setting and a transfer destination setting including a specific transfer condition are set, and a record is added to the transfer table 803. Additional details of FIG. 8B will be described below. A "DELETE" button 805 is a button for deleting a designated transfer table.

A received data print setting 806 is a setting pertaining to printing of received data by the printer 110 when the image processing apparatus 10 performs fax transfer. In a case where "PRINT ALWAYS" 807 is set, received data that is a transfer target when the image processing apparatus 10 performs fax transfer is always printed. In a case where "PRINT IN CASE OF ERROR ONLY" 808 is set, received data is printed only in a case where the received data is unsuccessfully transferred due to an error. In a case where "STORE IN CASE OF ERROR ONLY" 809 is set, received data is stored in the HDD 104 without being printed in a case where the received data is unsuccessfully transferred due to an error. With the stored data, an error destination can be checked and re-transmission can be performed.

In step S607, in a case where the received data transfer setting 801 is set to "ENABLE" (YES in step S607), the processing proceeds to step S608. In a case where the received data transfer setting 801 is set to "DISABLE" (NO in step S607), the process illustrated in FIG. 6A ends.

In step S608, the fax processing unit 112 acquires transfer condition information indicating details of the settings in FIG. 8B. Details of a process for the acquisition in step S608 will be described below with reference to FIG. 6C.

In step S609, the fax processing unit 112 determines whether the receipt information matches a received data transmission source setting of a transfer setting that is included in the information acquired in step S608. In a case where the receipt information matches the received data transmission source setting, the fax processing unit 112 refers to a transfer condition 831 of a received data transfer destination setting described below and determines whether to perform transfer. In a case where "DO NOT TRANSFER" is set (NO in step S609), the process illustrated in FIG. 6A ends. In a case where "TRANSFER ALL DATA" or "TRANSFER DATA RECEIVED ON DESIGNATED DAYS ONLY" is set (YES in step S609), the processing proceeds to step S610.

In step S610, the fax processing unit 112 performs fax transmission to a designated transfer destination via a public telephone network based on the settings in FIG. 8B. In a case where the transfer condition 831 is set to "TRANSFER DATA RECEIVED ON DESIGNATED DAYS ONLY", the transfer is performed in a case where a current day corresponds to a designated day.

In step S611, the generation unit 115 determines whether the setting of notification of fax transfer information to the chat application in FIG. 7 is set to "NOTIFY". In a case where the notification setting 703 of notification of fax transfer information to the chat application is set to "NOTIFY" (YES in step S611), the processing proceeds to step S612. In a case where the notification setting 703 of notification of fax transfer information to the chat application is set to "DO NOT NOTIFY" (NO in step S611), the process in FIG. 6 ends.

In step S612, the generation unit 115 generates transfer notification information to be notified to the chat server 20. Details thereof will be described below with reference to FIG. 6B. In step S613, the notification control unit 113 transmits the transfer notification information to the chat server 20, and the process illustrated in FIG. 6 ends.

A process of generating transfer notification information in step S612 described above will be described in detail below with reference to FIG. 6B.

In step S621, the notification control unit 113 acquires details (transfer destination address, result) of transfer information to be notified using a communication history stored in the HDD 104 as illustrated in FIG. 9. Information corresponding to the transfer setting is acquired from among records of the type "transmission (transfer)".

FIG. 9 is a diagram illustrating an example of a communication history table stored in the HDD 104 in a case where the image processing apparatus 10 communicates with another apparatus via fax or email. A communication history table 900 includes a single record as history information for each fax/email communication performed by the image processing apparatus 10 and records details of the communication.

The communication history table 900 includes a time 901, a type 902, a protocol 903, a destination name 904, an address 905, and a result 906.

The time 901 stores a time of fax communication. The type 902 records a type of a performed process. One of "RECEIVE", "TRANSMIT", or "TRANSMIT (TRANSFER)" is recorded as the type. The type of a transfer process that is performed based on the settings in FIGS. 8A and 8B is "TRANSMIT (TRANSFER)". The protocol 903 stores protocol information such as fax, Internet fax, or email. The destination name 904 stores a transmission destination name for a case where the type is "TRANSMIT", or stores a transmission source name for a case where the type is "RECEIVE". The address 905 stores a transmission destination address for a case where the type is "TRANSMIT", or stores a transmission source address for a case where the type is "RECEIVE". The result 906 stores a communication result "OK" (successful) or "NG" (unsuccessful).

A history 907 indicates a communication history with the time "2021/12/22 12:10", the type "RECEIVE", the protocol "FAX", the destination name "ZZZ", the address "075-ZZZZ-ZZZZ", and the result "NG" (unsuccessful).

In step S622, the generation unit 115 generates transfer notification information to be notified to the chat server 20 based on the information acquired in step S621.

In step S623, in a case where the result of the transfer information (transfer destination address, result) acquired in step S621 is "NG" (YES in step S623), the processing proceeds to step S624. In a case where the result is "OK" (NO in step S623), the processing proceeds to step S626.

In step S624, the CPU 101 determines whether the notification setting 704 of re-transmission inquiry to the chat application in a case of a transfer error in FIG. 7 is set to "NOTIFY". In a case where the notification setting 704 of re-transmission inquiry to the chat application in a case of a transfer error is set to "NOTIFY" (YES in step S624), the processing proceeds to step S625. In a case where the notification setting 704 is set to "DO NOT NOTIFY" (NO in step S624), the processing proceeds to step S626. In step S625, the notification control unit 113 adds a re-transmission inquiry message to the transfer notification information generated in step S622.

In step S626, the notification control unit 113 refers to the received data print setting 806 in FIG. 8A for a print setting when the transfer is performed. In a case where the received data print setting 806 is set to "STORE IN CASE OF ERROR ONLY" (YES in step S626), the process illustrated in FIG. 6B ends. In a case where the received data print setting 806 is set to "PRINT ALWAYS" or "PRINT IN CASE OF ERROR ONLY" (NO in step S626), the processing proceeds to step S627. In step S627, the notification control unit 113 adds a message indicating that printing has been performed to the transfer notification information.

A process of acquiring the transfer condition in step S608 described above will be described in detail below with reference to FIG. 6C.

In step S631, the fax processing unit 112 determines whether the setting 802 of transfer setting inquiry to the chat is set to "ENABLE". In a case where the setting 802 is set to "ENABLE" (YES in step S631), the processing proceeds to step S632. In a case where the setting 802 is set to "DISABLE" (NO in step S631), the processing proceeds to step S634.

In step S632, the fax processing unit 112 generates transfer condition inquiry information and transmits the generated transfer condition inquiry information to the chat server 20. The inquiry can be referred to using the chat application via the chat server 20. A user can set a transfer condition while checking the receipt information using the chat application. In step S633, the fax processing unit 112 of the image processing apparatus 10 receives transfer condition information including the set condition via the chat server 20.

In step S634, the fax processing unit 112 acquires the transfer condition setting in FIG. 8B stored in advance in the HDD 104 and described below.

In step S609 and subsequent steps, the transfer condition acquired in step S633 or S634 is used.

A transfer table registration setting will be described below with reference to FIG. 8B. A transfer table registration screen 820 is a screen for setting the transfer condition setting and the transfer destination setting.

A transfer table name 821 is a transfer table name, and at selection of an input area, a software keyboard screen is displayed so that a transfer table name can be input. In FIG. 8B, "TRANSFER 1" is input.

A reception line selection item 822 is an item for selecting a line so that fax received documents received via the selected line by the image processing apparatus 10 will be transferred. For example, in a case where "FAX" is selected as in FIG. 8B, the image processing apparatus 10 transfers only the received documents transmitted via fax lines.

A transmission source address setting item 823 is an item for selecting one of "TRANSFER ALL RECEIVED DATA" and "TRANSFER DATA RECEIVED FROM DESIGNATED TRANSMISSION SOURCE ONLY" as a transfer condition for a transmission source address.

In a case where "TRANSFER ALL RECEIVED DATA" is selected, received data is set as a transfer target without a condition regardless of a transmission source address. In a case where "TRANSFER DATA RECEIVED FROM DESIGNATED TRANSMISSION SOURCE ONLY" is selected, only received data that is received from a transmission source address registered in a transmission source address list 824 is set as a transfer target.

The transmission source address list 824 is a list including a destination name 825, a type 826, and an address 827.

In FIG. 8B, a transfer destination with the destination name "ZZZ", the type "FAX", and the address "075-ZZZZ-ZZZZ" is registered. The destination name 825 indicates a destination name, and the type 826 indicates a protocol type such as fax or Internet fax. The address 827 indicates a telephone number in a case where the type 826 is fax, or indicates an Internet fax address in a case where the type 826 is Internet fax.

An address can be added to the transmission source address list 824 from an address book or by directly inputting the address. To add an address from the address book to the list, an ADD (ADDRESS BOOK) button 828 is used. To add an address by directly inputting the address, an ADD (DIRECT INPUT) button 829 is used. To delete an address from the transmission source address list 824, a DELETE button 830 is used.

One of "DO NOT TRANSFER", "TRANSFER ALL DATA", or "TRANSFER DATA RECEIVED ON DESIGNATED DAYS ONLY" can be selected for the transfer condition 831 of the received data transfer destination setting. In a case where "DO NOT TRANSFER" is selected, the fax transfer is not performed even in a case where the image processing apparatus 10 receives a fax and conditions of the reception line selection and the transmission source address setting are met.

In a case where "TRANSFER ALL DATA" is selected, the fax transfer is always performed when the image processing apparatus 10 receives a fax and the conditions of the reception line selection and the transmission source address setting are met.

In a case where "TRANSFER DATA RECEIVED ON DESIGNATED DAYS ONLY" is selected, only faxes that are received on days designated via a day item 832 described below are transferred.

The day item 832 is a setting that is enabled in a case where "TRANSFER DATA RECEIVED ON DESIGNATED DAYS ONLY" is selected via the transfer condition item 831, and days to be a transfer target can be selected via the day item 832.

A transfer destination list 833 is a list where transfer destinations stored in the HDD 104 are registered. The transfer destination list 833 includes a destination name, a type, and an address as in the transmission source address list 824.

In the example in FIG. 8B, a transfer destination with the destination name "AAA", the type "FAX", and the address "075-XXXX-XXXX" is registered.

An address can be added to the transfer destination list 833 from the address book or by directly inputting the address. To add an address from the address book, an ADD (ADDRESS BOOK) button 834 is used. To add an address by directly inputting the address, an ADD (DIRECT INPUT) button 835 is used. To delete an address from the transfer destination list 833, a DELETE button 836 is used.

FIGS. 10A to 10D illustrate an example of a process sequence of the entire system in a case where a process according to an aspect of the present invention is performed.

FIG. 10A is a diagram illustrating a sequence in a case where the notification setting 703 of notification of fax transfer information to the chat application is "NOTIFY" and the notification setting 704 of re-transmission inquiry to the chat application in a case of a transfer error is "DO NOT NOTIFY".

In step S1301, the image processing apparatus 10 receives a fax from the fax apparatus 50. At this time, the image processing apparatus 10 acquires receipt information and a received image and stores the acquired receipt information and the acquired received image in the HDD 104.

In step S1302, the image processing apparatus 10 generates receipt notification information based on the receipt information stored in the HDD 104 and transmits the receipt notification information and the received image to the chat server 20.

In step S1303, the chat server 20 stores the receipt notification information and the received image data that are received from the image processing apparatus 10 in the storage unit 210. The chat processing unit 201 of the control unit 200 analyzes the receipt notification information and the received image data that are stored in the storage unit 210, and generates a chat message pertaining to the receipt notification information and the received image based on the dialogue data 212.

In step S1304, the chat application of the terminal apparatus 30 acquires, from the chat server 20, the message pertaining to the receipt notification information and the received image that is generated in step S1303. In step S1305, the chat application of the terminal apparatus 30 displays the message pertaining to the receipt notification information and the received image on the display unit 320 as illustrated in FIG. 11A.

Figure 11A:
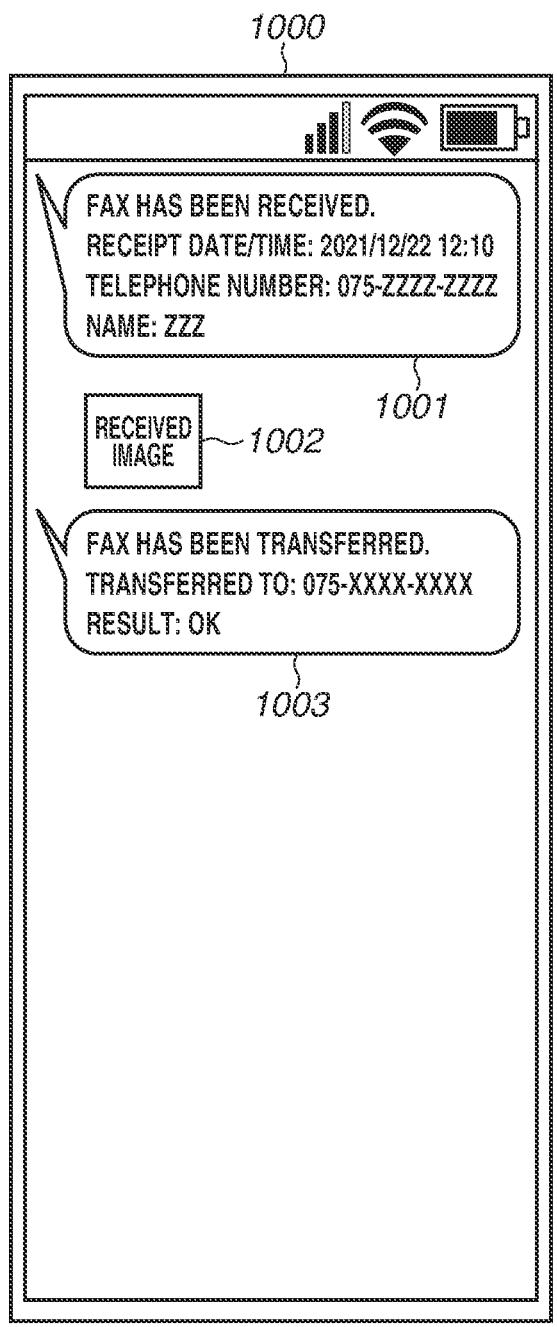
FIGS. 11A to 11E are diagrams illustrating a chat application screen in a case where the image processing apparatus makes notification of receipt information and transfer information to the terminal apparatus.

FIG. 11A illustrates a screen example 1000 of the chat application. A message 1001 in FIG. 11A displays a receipt date/time, a telephone number, and a transmitter name based on the receipt notification information received from the chat server 20. A message 1002 displays a received image icon as the received image received from the chat server 20. A message 1003 displays a message pertaining to a transfer destination and a transfer result that are included in the transfer notification information received from the chat server 20.

In step S1306, the fax processing unit 112 of the image processing apparatus 10 performs transfer based on the transfer condition setting stored in the HDD 104 as illustrated in FIG. 6A. In step S1307, the image processing apparatus 10 generates transfer notification information based on the transfer information including the transmission address information and the result information of the communication history table 900 stored in the HDD 104 and transmits the generated transfer notification information to the chat server 20. In step S1308, the chat server 20 stores the transfer notification information received from the image processing apparatus 10 in the storage unit 210.

The chat processing unit 201 of the control unit 200 analyzes the transfer notification information stored in the storage unit 210 and generates a chat message pertaining to the transfer notification information based on the dialogue data 212.

In step S1309, the chat application of the terminal apparatus 30 acquires, from the chat server 20, the chat message pertaining to the transfer notification information that is generated in step S1308. In step S1310, the chat application of the terminal apparatus 30 additionally displays the message pertaining to the transfer notification information as in the message 1003 illustrated in FIG. 11A.

FIG. 10B is a diagram illustrating a sequence in a case where the notification setting 703 of notification of fax transfer information to the chat application is "NOTIFY" and the notification setting 704 of re-transmission inquiry to the chat application in a case of a transfer error is "NOTIFY". Steps S1401 to S1406 are similar in processing to steps S1301 to S1306 in FIG. 10A, so redundant descriptions thereof are omitted.

In step S1407, the image processing apparatus 10 generates transfer notification information based on the transfer information including the transmission address information and the result information of the communication history table 900 stored in the HDD 104. Since the notification setting 704 of re-transmission inquiry to the chat application in a case of a transfer error that is stored in the HDD 104 is "NOTIFY", the image processing apparatus 10 adds re-transmission inquiry information to the transfer notification information and transmits the transfer notification information with the re-transmission inquiry information to the chat server 20.

In step S1408, the chat server 20 stores the transfer notification information received from the image processing apparatus 10 in the storage unit 210. The chat processing unit 201 of the control unit 200 analyzes the transfer notification information stored in the storage unit 210 and generates a chat message pertaining to the transfer notification information based on the dialogue data 212.

In step S1409, the chat application of the terminal apparatus 30 acquires the chat message pertaining to the transfer notification information including the re-transmission inquiry information that is generated in step S1408 from the chat server 20. In step S1410, the chat application of the terminal apparatus 30 also displays the acquired message on the display unit 320 as in the messages 1003 and 1004 in FIG. 11B.

Figure 11B:
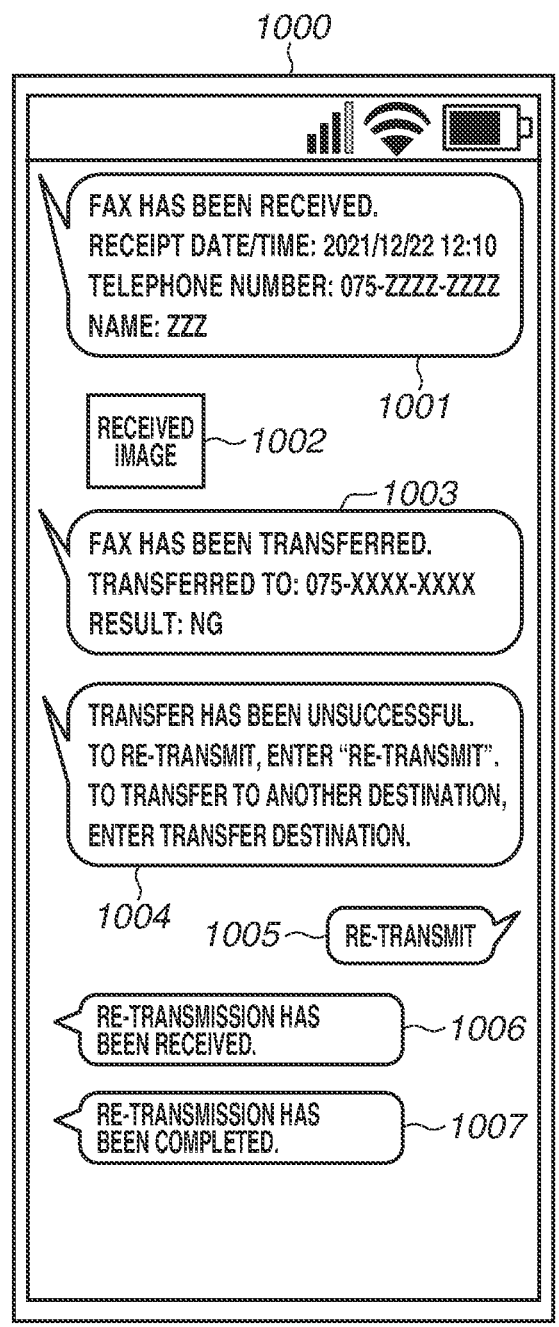
Figure 11C:
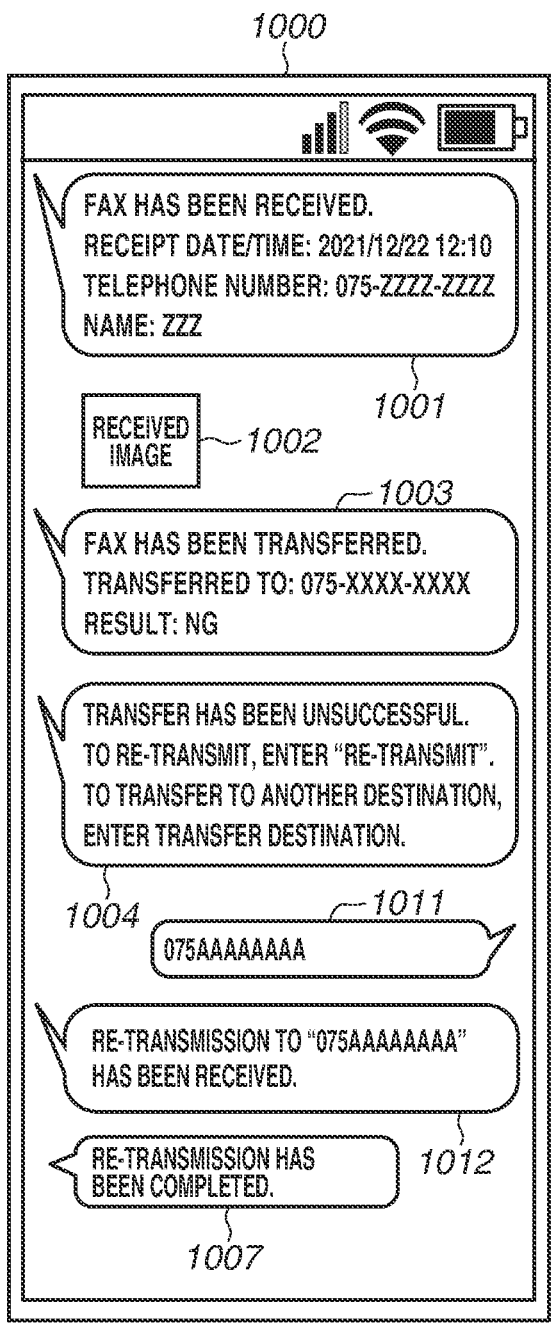

In step S1411, the chat application of the terminal apparatus 30 displays a message 1005 illustrated in FIG. 11B in a case where a re-transmission instruction is received based on a user operation, or displays a message 1011 illustrated in FIG. 11C in a case where a transfer destination telephone number input by a user is received. At this time, in step S1412, a chat processing unit 301 of the control unit 300 transmits a re-transmission notification message corresponding to the messages 1005 and 1011 to the chat server 20.

In step S1413, the chat server 20 analyzes the received message using the chat processing unit 201 of the control unit 200. In step S1414, the chat server 20 transmits the message as an instruction to the image processing apparatus 10.

In step S1415, the image processing apparatus 10 analyzes the instruction received from the chat server 20, and in a case where the instruction is a re-transmission instruction, the image processing apparatus 10 performs re-transmission, whereas in a case where a telephone number is designated, the image processing apparatus 10 performs a process of re-transmitting the fax to the designated telephone number. In step S1416, the image processing apparatus 10 generates re-transmission result notification information based on the re-transmission result using the generation unit 115 and transmits the generated re-transmission result notification information to the chat server 20 using the notification control unit 113.

In step S1417, the chat server 20 analyzes the re-transmission result information received from the image processing apparatus 10 using the chat processing unit 201 of the control unit 200 and generates a chat message.

In step S1418, the chat application of the terminal apparatus 30 acquires, from the chat server 20, the chat message pertaining to the re-transmission result that is generated in step S1417. In step S1419, the chat application displays a message 1007 in FIGS. 11B and 11C based on the acquired message.

FIG. 10C is a diagram illustrating a sequence in a case where the received data print setting of the received data transfer/storage setting is "PRINT IN CASE OF ERROR ONLY" ("PRINT ALWAYS"). Steps S1501 to S1506 are similar in processing to steps S1301 to S1306 in FIG. 10A, so redundant descriptions thereof are omitted.

In step S1507, the image processing apparatus 10 acquires the received data print setting of the received data transfer/storage setting stored in the HDD 104. Since the setting is "PRINT IN CASE OF ERROR ONLY", the printer control unit 106 prints the received image and outputs the printed image using the printer 110.

In step S1508, the generation unit 115 generates transfer notification information based on the transfer information including print execution information in addition to the transmission address, the result, and the re-transmission inquiry information of the communication history table 900 stored in the HDD 104 and transmits the generated transfer notification information to the chat server 20.

In step S1509, the chat server 20 stores the transfer notification information received from the image processing apparatus 10 in the storage unit 210. The chat processing unit 201 of the control unit 200 analyzes the transfer notification information stored in the storage unit 210 and generates a chat message pertaining to the transfer notification information based on the dialogue data 212.

In step S1510, the chat application of the terminal apparatus 30 acquires, from the chat server 20, the chat message pertaining to the transfer notification information that is generated in step S1509. In step S1511, the chat application displays the messages 1003, 1020, and 1004 illustrated in FIG. 11D on the display unit 320 based on the acquired message. The message 1020 is a message indicating that the image processing apparatus 10 has printed the received image indicated by the message 1002 based on the main setting in the image processing apparatus 10.

Steps S1512 to S1520 are similar in processing to steps S1411 to S1419 in FIG. 10B, so redundant descriptions thereof are omitted.

FIG. 10D is a diagram illustrating a sequence in a case where the setting 802 of transfer setting inquiry to the chat server 20 in the transfer/storage setting is "ENABLE". Steps S1601 to S1605 are similar in processing to steps S1301 to S1305 in FIG. 10A, so redundant descriptions thereof are omitted.

In step S1606, the image processing apparatus 10 transmits transfer condition inquiry information to the chat server 20.

In step S1607, the chat server 20 analyzes the transfer condition inquiry information received from the image processing apparatus 10 using the chat processing unit 201 of the control unit 200. In step S1608, the chat server 20 transmits the transfer condition stored in the storage unit 210 to the image processing apparatus 10.

In step S1609, in a case where the receipt information matches the transfer condition received from the chat server 20, the image processing apparatus 10 transfers the fax to the transfer destination received from the chat server 20.

Steps S1610 to S1622 are similar in processing to steps S1407 to S1419 in FIG. 10B, so redundant descriptions thereof are omitted.

The messages in FIG. 11B that are different from those in FIG. 11A will be described below.

The message 1004 displays a text prompting a user to input "re-transmit" or another destination to transfer to the other destination based on a re-transmission message included in the transfer notification information received from the chat server 20. The message 1005 displays "RE-TRANSMIT" as a result of inputting "re-transmit" by a user via the operation unit 109.

A message 1006 displays a text indicating that the terminal apparatus 30 has received the re-transmission. The terminal apparatus 30 transmits a re-transmission message to the chat server 20. The chat processing unit 201 of the chat server 20 having received the re-transmission message recognizes, from the text "re-transmit", that an instruction to perform a re-transmission process is received, and transmits a re-transmission notification to the image processing apparatus 10. The message 1007 displays a text indicating that the re-transmission has been completed based on the re-transmission result information received from the chat server 20.

The messages in FIG. 11C that are different from those in FIG. 11A will be described below.

The message 1011 displays "075AAAAAAAA" as a result of inputting a transfer destination by a user via the operation unit 109.

A message 1012 displays a message indicating that the terminal apparatus 30 has received the re-transmission to the other destination "075AAAAAAAA". The chat processing unit 201 of the chat server 20 having received the message recognizes, from the text "075AAAAAAAA", that an instruction to perform a process of transmitting to the other destination is received, and transmits a re-transmission instruction to the image processing apparatus 10. The message 1007 displays a message indicating that the re-transmission has been completed based on the re-transmission result information received from the chat server 20.

Figure 11D:
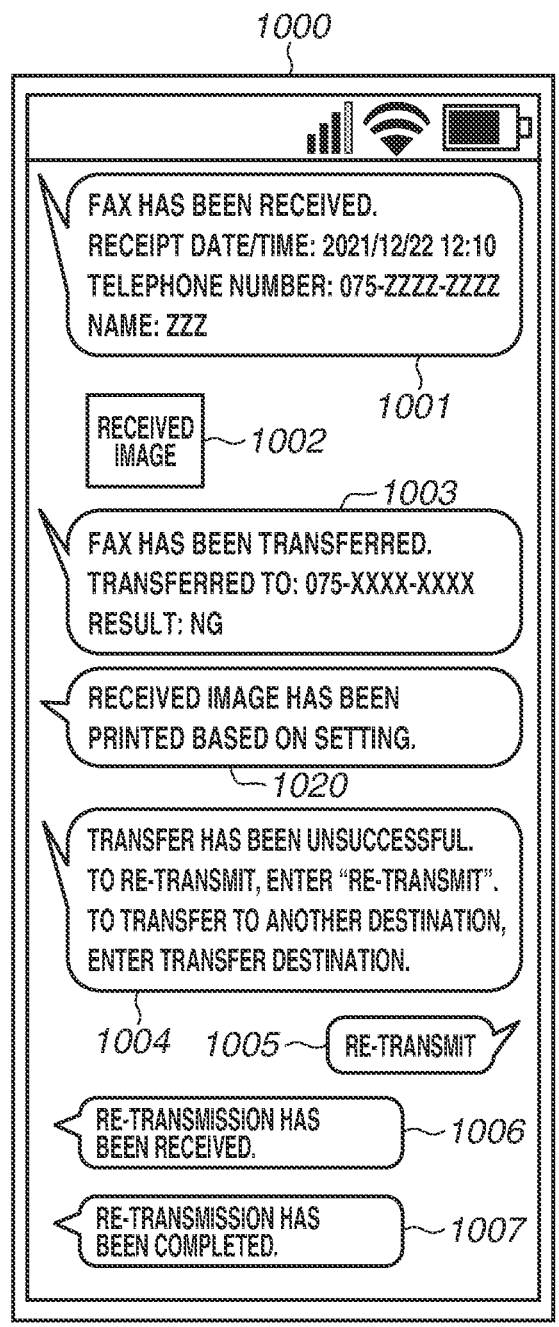

The messages in FIG. 11D that are different from those in FIGS. 11A and 11B will be described below.

The message 1020 displays a message indicating that the received image has been printed by the printer 110 of the image processing apparatus 10 based on a print output message included in the transfer notification information received from the chat server 20.

Figure 11E:
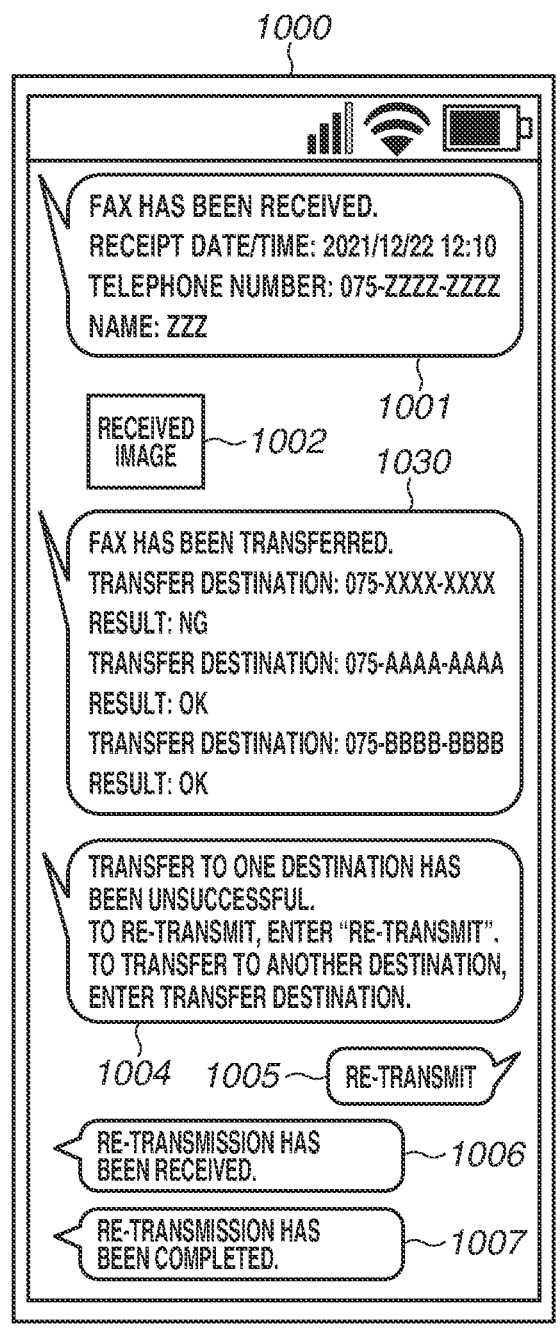

FIG. 11E displays a screen example 1000 of the chat application in a case where there is a plurality of transfer destinations in step S1306 in the sequence in FIG. 10A.

A message 1030 displays a message indicating the plurality of transfer destinations and transfer results that are included in the transfer notification information received from the chat server 20. The messages 1004 to 1007 are similar to those in FIG. 11B, so redundant descriptions thereof are omitted.

Modified Examples

According to the above-described exemplary embodiments, in a case where the image processing apparatus 10 receives data using the fax function and performs the transfer process, each piece of information is shared with a user in cooperation with the chat server 20 using the chat service.

According to another exemplary embodiment, information transmitted to the chat server 20 can be transmitted via email to an email address designated and registered in advance by the image processing apparatus 10. Specifically, information such as the messages 1001, 1002, 1003, 1020, and 1030 in FIGS. 11A to 11E can be shared via email with a user corresponding to the email address.

The use of email, while not as efficient with respect to issuing an interactive re-transmission instruction or an instruction to change a re-transmission destination like the chat service, it does provide a similar advantage that a fixed user can recognize the transfer information is still produced.

Other Exemplary Embodiments

The above-described exemplary embodiments can be implemented as an apparatus or a system that is to execute one or more pieces of software (program) for realizing the function(s) of the above-described exemplary embodiments. A method for realizing the above-described exemplary embodiments can be performed by the apparatus or the system. The program is supplied to the system or the apparatus via a network or various types of storage mediums, and one or more computers (CPU, micro-processing unit (MPU)) of the system or the apparatus read the program and execute the read program. The functions of the above-described exemplary embodiments can also be realized by a circuit (e.g., application-specific integrated circuit (ASIC)).

According to the above-described exemplary embodiments, a user can recognize, via a communication tool, a processing result in a case where an image processing apparatus receives a fax.

While exemplary embodiments have been provided, these embodiments are not seen to be limiting. The scope of the following claims is to be accorded the broadest interpretation so as to encompass all such modifications and equivalent structures and functions.

This application claims the benefit of Japanese Patent Application No. 2022-079898, filed May 16, 2022, which is hereby incorporated by reference herein in its entirety.

What is claimed is:
1. An image processing apparatus including a fax function and a communication function, the image processing apparatus comprising:
   at least one memory storing instructions; and
   at least one processor executing the instructions causing the image forming apparatus to:
   set a first setting for transfer of data in a case where the data is received using the fax function;
   perform a transfer process of transferring the data received using the fax function based on the first setting; and
   transmit, using the communication function, information pertaining to the transfer process to an external apparatus that provides a message sharing service,
   wherein executing the instructions further cause the image forming apparatus to set a second setting for notification of the information pertaining to the transfer process based on the first setting to the external apparatus, and
   wherein in a case where the second setting is set to provide notification to the external apparatus, the infor- mation pertaining to the transfer process is transmitted to the external apparatus using the communication function.

2. The image processing apparatus according to claim 1, wherein executing the instructions further cause the image forming apparatus to transmit information pertaining to receipt of the data to the external apparatus based on receipt of the data using the fax function.

3. The image processing apparatus according to claim 1, the image processing apparatus further comprising a printer, wherein executing the instructions further cause the image forming apparatus to transmit information pertaining to printing of the data in a case where the data received using the fax function is printed by the printer.

4. The image processing apparatus according to claim 1, wherein executing the instructions further cause the image forming apparatus to re-transmit the data using the fax function in a case where information indicating re-transmission of the data that has been unsuccessfully transferred in the transfer process is received via the external apparatus.

5. The image processing apparatus according to claim 1, wherein the information pertaining to the transfer process includes transfer destination information and a result of the transfer process.

6. The image processing apparatus according to claim 1, wherein executing the instructions further cause the image forming apparatus to transmit, via email, the information pertaining to the transfer process to an email address designated and registered in advance.

7. A method for controlling an image processing apparatus including a fax function and a communication function, the method comprising:
    setting a first setting for transfer of data in a case where the data is received using the fax function;
    performing a transfer process of transferring the data received using the fax function based on the first setting; and
    transmitting, using the communication function, information pertaining to the transfer process to an external apparatus that provides a message sharing service,
        wherein executing the instructions further cause the image forming apparatus to set a second setting for notification of the information pertaining to the transfer process based on the first setting to the external apparatus, and
wherein in a case where the second setting is set to provide notification to the external apparatus, the information pertaining to the transfer process is transmitted to the external apparatus using the communication function.

8. A non-transitory computer readable storage medium storing a computer program for causing a computer to execute a method for controlling an image processing apparatus including a fax function and a communication function, the method comprising:
    setting a first setting for transfer of data in a case where the data is received using the fax function;
    performing a transfer process of transferring the data received using the fax function based on the first setting; and
    transmitting, using the communication function, information pertaining to the transfer process to an external apparatus that provides a message sharing service,
    wherein executing the instructions further cause the image forming apparatus to set a second setting for notification of the information pertaining to the transfer process based on the first setting to the external apparatus, and
    wherein in a case where the second setting is set to provide notification to the external apparatus, the information pertaining to the transfer process is transmitted to the external apparatus using the communication function.

* * * * *